(12) United States Patent
Reid

(10) Patent No.: US 8,799,027 B2
(45) Date of Patent: *Aug. 5, 2014

(54) SYSTEMS AND METHODS FOR PURCHASING INSURANCE

(75) Inventor: Jamie Reid, San Diego, CA (US)

(73) Assignee: Oferta, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/019,957

(22) Filed: Feb. 2, 2011

(65) Prior Publication Data

US 2012/0197667 A1 Aug. 2, 2012

(51) Int. Cl.
*G06Q 40/00* (2012.01)
*G06Q 30/06* (2012.01)
*G06Q 50/22* (2012.01)
*G06Q 40/08* (2012.01)

(52) U.S. Cl.
CPC .............. *G06Q 30/06* (2013.01); *G06Q 50/22* (2013.01); *G06Q 40/00* (2013.01); *G06Q 40/08* (2013.01)
USPC .............................................. 705/4; 705/35

(58) Field of Classification Search
CPC ....... G06Q 40/08; G06Q 40/02; G06Q 50/22; G06Q 50/24; G06Q 40/00
USPC ................... 705/4, 2, 30, 35; 235/487, 375
See application file for complete search history.

(56) References Cited

U.S. PATENT DOCUMENTS

| | | | | |
|---|---|---|---|---|
| RE31,302 E | * | 7/1983 | Stambler | 340/5.4 |
| 5,682,524 A | * | 10/1997 | Freund et al. | 711/5 |
| 5,809,497 A | * | 9/1998 | Freund et al. | 1/1 |
| 5,905,248 A | * | 5/1999 | Russell et al. | 235/462.15 |
| 7,606,865 B2 | * | 10/2009 | Kumar et al. | 709/206 |
| 7,657,479 B2 | * | 2/2010 | Henley | 705/37 |
| 7,904,532 B2 | * | 3/2011 | Rudy et al. | 709/218 |
| 8,041,636 B1 | * | 10/2011 | Hunter et al. | 705/40 |
| 8,095,399 B2 | * | 1/2012 | McConnell et al. | 705/4 |
| 2002/0095372 A1 | * | 7/2002 | Likourezos et al. | 705/39 |
| 2008/0065580 A1 | * | 3/2008 | Spence et al. | 706/62 |
| 2008/0091515 A1 | * | 4/2008 | Thieberger et al. | 705/10 |
| 2009/0177548 A1 | * | 7/2009 | Eisenlohr | 705/14 |
| 2009/0210258 A1 | * | 8/2009 | Cardot et al. | 705/4 |
| 2009/0210259 A1 | * | 8/2009 | Cardot et al. | 705/4 |
| 2010/0125466 A1 | * | 5/2010 | Labelle et al. | 705/4 |
| 2010/0271650 A1 | * | 10/2010 | Tomizawa et al. | 358/1.13 |
| 2011/0166893 A1 | * | 7/2011 | McConnell et al. | 705/4 |
| 2012/0072242 A1 | * | 3/2012 | Fiori et al. | 705/4 |

OTHER PUBLICATIONS

Anonymous, Chapter 3 online financial services: Banking, mortgages, insurance, trading, etc (2001). Plunkett Research Ltd. Retrieved from http://search.proquest.com/professional/docview/1083954914?accountid=161862.*

(Continued)

*Primary Examiner* — Kelly Campen
(74) *Attorney, Agent, or Firm* — Procopio, Cory, Hargreaves & Savitch LLP; Noel C. Gillespie

(57) ABSTRACT

Systems and methods related to an online website wherein businesses seeking insurance can obtain quotations and be connected to a plurality of insurance providers are described herein. In some embodiments, the businesses are authenticated and verified by providing such details as, e.g., employer identification number (EIN) or tax identification number (TIN), and being registered with the system prior to requesting quotations. In some embodiments, the system has an online collaboration system where a business can ask or post questions and receive answers from insurance providers or agents who match their search criteria.

30 Claims, 22 Drawing Sheets

(56) References Cited

OTHER PUBLICATIONS

Friend, J. R. (2001). Website usefulness for third agers: A case study of older adults and senior-related websites. (Order No. 3000127, University of Virginia). ProQuest Dissertations and Theses, 187-187 p. Retrieved from http://search.proquest.com/professional/docview/304727888?accountid=161862. (304727888).*

Simms, N. C. (2011). The counterfeit consumer: Counterfeit luxury goods and the negotiation of space and subjectivity. (Order No. 3490786, University of Minnesota). ProQuest Dissertations and Theses, 333. Retrieved from http://search.proquest.com/professional/docview/917947161?accountid= 161862. (917947161).*

* cited by examiner

Page Name: Create_Agent_Account
Page View: Main
Purpose: Create a new agent account 210 — First Name: Mark 220 — Last Name: Morris 230 — Company: ClosedWon 240 — Email: mark@closedwoncrm.com 250 — Insurance License #: 111111111

270 — Terms of Service:
Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

260 — ☐ I agree to the terms of service

280 — [ Create Agent Account ]

Page Name: Create_Agent_Account
Page View: Email_Error
Purpose: Display if an invalid email is entered

Terms of Service:

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

First Name:
Mark

Last Name:
Morris

Company:
ClosedWon

Email:
mark@closedwoncrm.com

Insurance License #:
111111111

☐ I agree to the terms of service

Create Agent Account

310 → The entered Email is not valid. Please try again.

FIG. 5

Page Name: Create_Agent_Account
Page View: Confirmation
Purpose: Notify Agent user that an account has been crated and provide directions to login.

Thank you for creating a new Agent account. An Email has been sent with your temporary password and instructions to view your account.

400

Note: This email will provide a temporary password plus a link to the Temporary Password page.

FIG. 6

Page Name: Create_Agent_Account
Pager View: N/A
Purpose: Email template

Dear [FirstName LastName],

Thank you for creating an Agent account. Here is a temporary password.

Password: [Password]

Please visit [URL Link to Temporary_Password] to log into your account.

Thanks,
Oferta Customer Service

FIG. 7

Page Name: Create_Business_Account
Page View: Email_Error
Purpose: Create a new business account

Terms of Service:

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

First Name:
Mark

Last Name:
Morris

Company:
ClosedWon

Email:
mark@closedwoncrm.com

Federal Tax ID (EIN):
11-1111111

☐ I agree to the terms of service

Create Business Account

1010 ⎯ The entered Email is not valid. Please try again.

FIG. 12

Page Name: Account_New
Page View: Confirmation
Purpose: Notify Business user that an account ahas been created and provide directions to login.

Thank you for creating a new Business account. An Email has been sent with your password and instructions to view your account.

1100

Note: This email will provide a temporary password plus a link to the Temporary Password page.

Page Name: Create_Busienss_Account
Pager View: N/A
Purpose: Email template

Dear [FirstName LastName],

Thank you for creating a Business account. Here is a temporary password.

Password: [Password]

Please visit [URL Link to Temporary_Password] to log into your account.

Thanks,
Oferta Customer Service

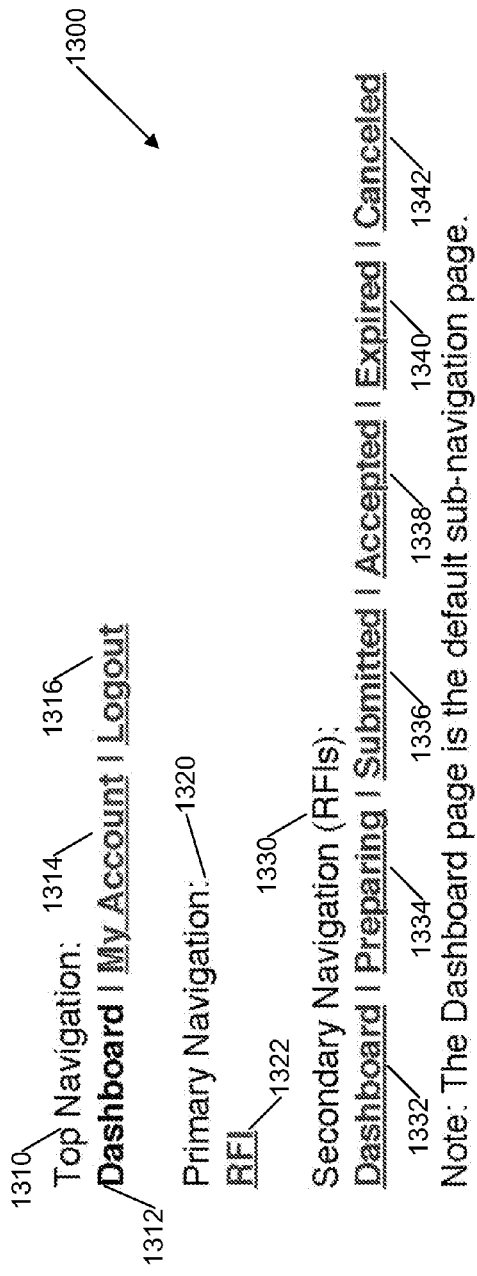
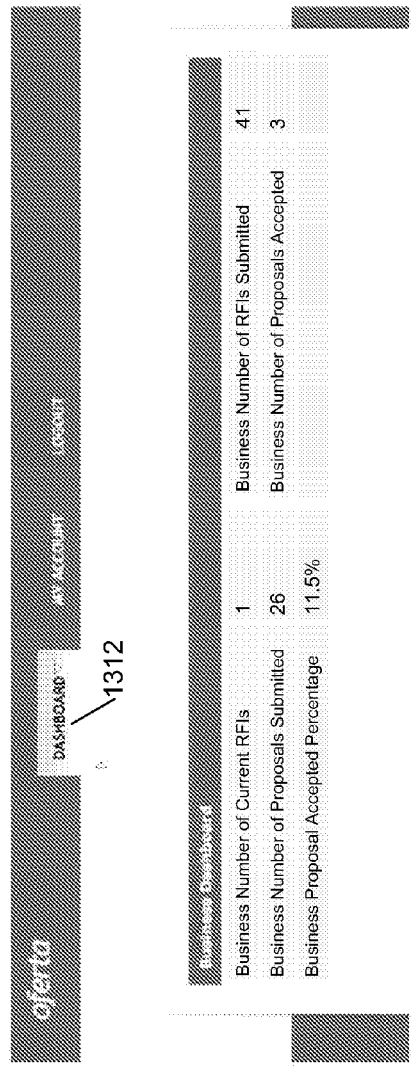
FIG. 15

Business My Account 1312 1314 1316

Dashboard | My Account | Logout

RFI 1322

1400

Business Information - Edit or Change Password    Dashboard | My Account | Logout User Information
  Name   Oferta Business2
  E-mail  oferta.business2@closedwoncrm.com Phone Information
  User Phone  (505) 555-1212    User Mobile Business Information
  Business Name  Oferta Business2 Name    Business Name
  Business Type  Contractor               Business Fax
  Business State  California              Business Annual Sales  $1,000,000
  Business FEIN  12-3456789               Business Annual Payroll
  Business Number of Vehicles             Business Number of Employees  5
  Business Description

RFI force.com

| RFI Status | | | | |
|---|---|---|---|---|
| Status | Expired | | RFI Number | 00000006689 |

RFI Detail Information

| | | | | |
|---|---|---|---|---|
| Primary Agent: | ✓ | | Any Losses (Last 5 Years) | ✓ |
| Policy Effective Date | 1/1/2011 | | Current Insurance Carrier | Travelers |
| Policy Expiration Date | 1/1/2012 | | | |
| Special Instructions | Please see loss history, and safety programs published on the message boards. We have made significant changes so help control our high ex-mod (1.58) such as introduction of pre-employment physicals, management incentive program and a full return to work program with objective job descriptions. Agent and carrier presented must have good history with high ex-mod accounts. Short listed agents will be invited for an in person meeting. Proposals needed by 12/19/2010. Thank you. | | | |

Accepted Proposal Information

| | | | |
|---|---|---|---|
| Proposal Accepted Date | | Proposal Accepted Agency Name | |
| Proposal Accepted Amount | $0 | | |

Bid Invitations

| Agent | Date | | Primary Agent |
|---|---|---|---|
| Bob Richardson | 11/1/2010 | | |

Attachments

Messages | Create Message

| Message ID | Date | Sender | Recipient | Message | Attachment |
|---|---|---|---|---|---|
| FR-00000000002 | 11/1/2010 | Emily | Chris | Please find our currently valued loss runs and up to date P&L. | logo<br>more.jpg |
| | | Gilbert | Wilson | | |
| | | Chris | Emily | The 2009 loss runs are not valued within 90 days...do you have the | |

FIG. 21

SYSTEMS AND METHODS FOR PURCHASING INSURANCE

BACKGROUND

1. Technical Field

The embodiments described herein are related to an online website where businesses seeking insurance can obtain quotations and be connected to a plurality of insurance providers.

2. Related Art

In recent years, electronic commerce has become increasingly popular with consumers. In line with this trend, the ease of accessing and reviewing insurance information online, and the speed of electronic processing of data, has attracted consumers to insurance providers having an online presence.

Some insurance providers have set up electronic sites, such as Internet Web sites, that enabled consumers to locate agents of the insurance providers. Consumers providing address information to an insurance provider's Web site would in return receive information identifying the closest agents of the insurance provider that were qualified for the type of insurance the consumers were seeking.

As time progressed, insurance providers began providing quotation services via the Internet. Insurance providers would calculate an estimated cost of insurance based on brief questionnaires provided to consumers regarding the insurability of the consumers' property or business and the desired insurance. The quoted cost was typically accompanied by an invitation to the consumer to contact the insurance provider or one of its agents offline to pursue the insurance coverage.

Recognizing that consumers were increasingly willing to provide information needed for insurance coverage via the Internet, especially as transmission security improved, insurance providers began providing insurance application processes online in which consumers were given user friendly interfaces that enabled them to provide information required for an insurance application. However, certain deficiencies remain that prevent consumers from completing an insurance application process entirely online. For example, insurance providers may further require confirmation of a customer's identification. Additionally, in transactions requiring significant expense, the consumer may require confirmation of the agents' identification.

Thus, the embodiments described herein are directed to a method and system that address the foregoing needs and deficiencies and provides better processing of insurance applications online.

SUMMARY

Systems and methods related to an online website where businesses seeking insurance can obtain quotations and be connected to a plurality of insurance providers are described herein. In some embodiments, the businesses are authenticated and verified by providing such details as, e.g., employer identification number (EIN) or tax identification number (TIN), and being registered with the system prior to requesting quotations. In some embodiments, the system has an online collaboration system where a business can ask or post questions and receive answers from insurance providers or agents who match their search criteria.

According to one aspect, a system for allowing a business to purchase insurance, comprising: a communication interface; a data storage system configured to store registration information for a plurality of business and a plurality of agents; a server coupled with the data storage system and the communication interface, the server configured to: receive registration requests from a plurality of agents through the communication interface; for each of the plurality of agents: request an agent license information in response to the request via the communication interface, receive an agent license information from the agent through the communication interface, validate the license information, request product information from the agent via the communication interface, and receive the product information through the communication interface, and when the license information is valid, then store the license and product information in the storage system; receive a registration request from a business; request tax identification information from the business in response to the registration request via the communication interface; receive the tax identification information via the communication interface; validate the tax identification information; when the tax identification information is valid, then store the tax identification information in the storage system; allow the business to create a request for information defining certain product information; and filter the plurality of agents based on the certain product information and the product information each agent provided to identify potential agents that meet requirements of the request for information and making the request for information available to those potential agents.

According to another aspect, a method for allowing a business to purchase insurance, comprising: receiving registration requests from a plurality of agents through a communication interface; wherein for each of the plurality of agents the following steps are performed: requesting an agent license information in response to the request via the communication interface, receiving an agent license information from the agent through the communication interface, validating the license information, requesting product information from the agent via the communication interface, and receiving the product information through the communication interface, and when the license information is valid, then storing the license and product information in a storage system; receiving a registration request from a business; requesting tax identification information from the business in response to the registration request via the communication interface; receiving the tax identification information via the communication interface; validating the tax identification information; when the tax identification information is valid, then storing the tax identification information in the storage system; allowing the business to create a request for information defining certain product information; and filtering the plurality of agents based on the certain product information and the product information each agent provided to identify potential agents that meet requirements of the request for information and making the request for information available to those potential agents.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 4-9 are exemplary screen shots the insurance provider navigates when becoming a trusted provider in accordance with one embodiment;

FIGS. 11-16 are exemplary screen shots the business user navigates when becoming a trusted user in accordance with one embodiment;

FIGS. 19-21 are exemplary screen shots of a message or bulletin board in accordance with one embodiment.

DETAILED DESCRIPTION

After reading this description, it will become apparent to one skilled in the art how to implement the embodiments described herein as well as various alternative embodiments and alternative applications. The following description sets forth numerous specific details, such as examples of specific systems, components and methods in order to provide a good understanding of the several embodiments disclosed. It will be apparent to one skilled in the art, however, that at least some embodiments may be practiced without these specific details. In other instances, well-known components or methods are not described in detail or are presented in simple block diagram format in order to avoid unnecessarily obscuring the described embodiments. Particular implementations may vary from these exemplary details and still be contemplated to be within the spirit and scope of the embodiments described.

Described herein are systems and methods for online insurance quotations that allow authenticated businesses to communicate with insurance providers or agents who match their search criteria. Additionally, the systems and methods described herein provide an online collaboration system where a business can ask or post questions and receive answers from insurance providers or agents.

Figure 1:
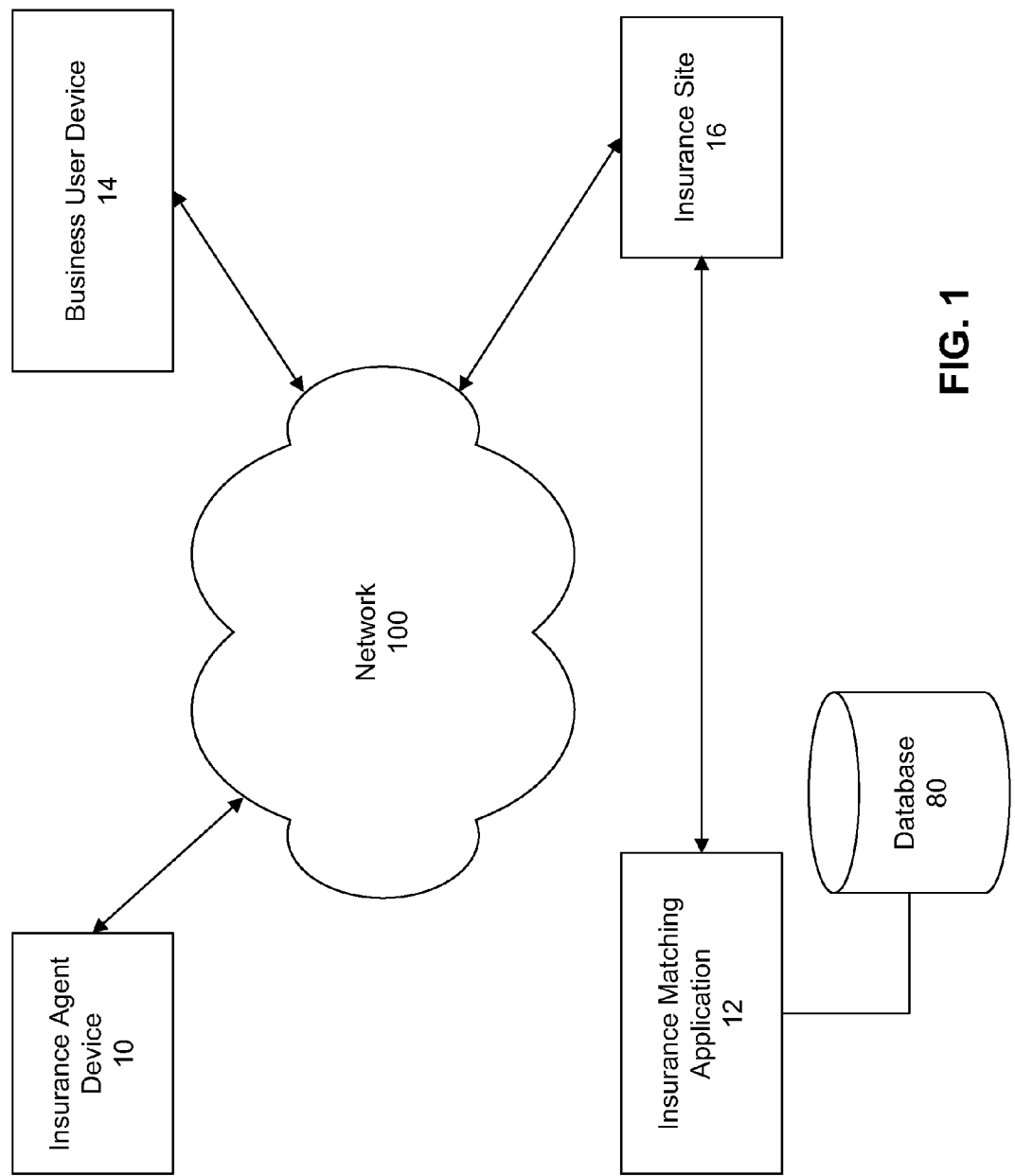
FIG. 1 is a high level block diagram representation of a collection of computer systems which can interact with each other by a connection in accordance with one embodiment.

Turning now to FIG. 1, a block diagram representation of a collection of computer systems which can interact with each other by a connection, such as the Internet, local area networks, wide area networks, virtual private networks, and direct connections is shown. A network 100 is shown providing the connection between the devices in FIG. 1. Each of the blocks shown in FIG. 1 represents a computer system, such as a server, a personal computer or other devices capable of communicating over the connections, or a collection of such devices and are generally referred to herein as devices.

In general, block 10 represents a device of a user or member insurance provider or agent of the system. The device 10 can be any network device. In general, the device 10 is a machine with the ability to communicate with one or more of the computer systems depicted in FIG. 1. For example, in one embodiment, the device 10 is a personal computer with a network connection such as an Internet connection or a wireless device, such as a mobile telephone or a personal digital assistant, with access to a wireless network. Similarly, devices 14 and 16 can be the same types of devices as device 10. As shown, block 14 represents a device of a user or member business of the system and block 16 represents a device (e.g., a Web server) hosting an insurance matching website.

An insurance matching website, as used in connection with certain embodiments herein, relies upon a collection of insurance providers and business users for building an online community for shopping and purchasing various types of business-related insurance. Business-related insurance may include the following types: auto, directors and officers, general, professional, property (e.g., theft, fire), employee benefits (e.g., dental, medical, practice liability, worker's compensation), etc.

In general, the insurance matching service allows both insurance providers or agents and business users to create a profile for themselves. The profiles of the insurance providers and business users are generally kept private until a match is made based on a number of criteria. In some embodiments, once a match is made, it is presented to one or both of the business user and insurance agent in their respective accounts (e.g., dashboards) or emailed directly to them.

Referring back to FIG. 1, in one embodiment, device 16 represents an insurance matching site for requesting insurance bids and matching with insurance providers with business users. Device 16 provides (serves) Web pages which can be visited by business users (e.g., members) and others (e.g., guests) to interact with the system as will be described in more detail below.

According to one aspect, block 12 represents a computer system or device that provides the back-end functionality for the insurance matching site 16. System 12 is in communication with a database 80. Database 80 allows system 12 to store necessary information that system 12 may need to access for performing the back-end functionality. Of course, other configurations of computers can also be used.

In one example, system 12 supports an insurance website for matching insurance providers or agents with business users. The system 12 provides insurance verification and matching services that are Web based and can include, for example, a variety of ways for users to interact, including allowing a business user to request insurance quotations from one or more insurance providers and allowing a business user to post or ask questions on a message board. In some embodiments, the message board includes a public section and a private or semi-private section.

Figure 2:
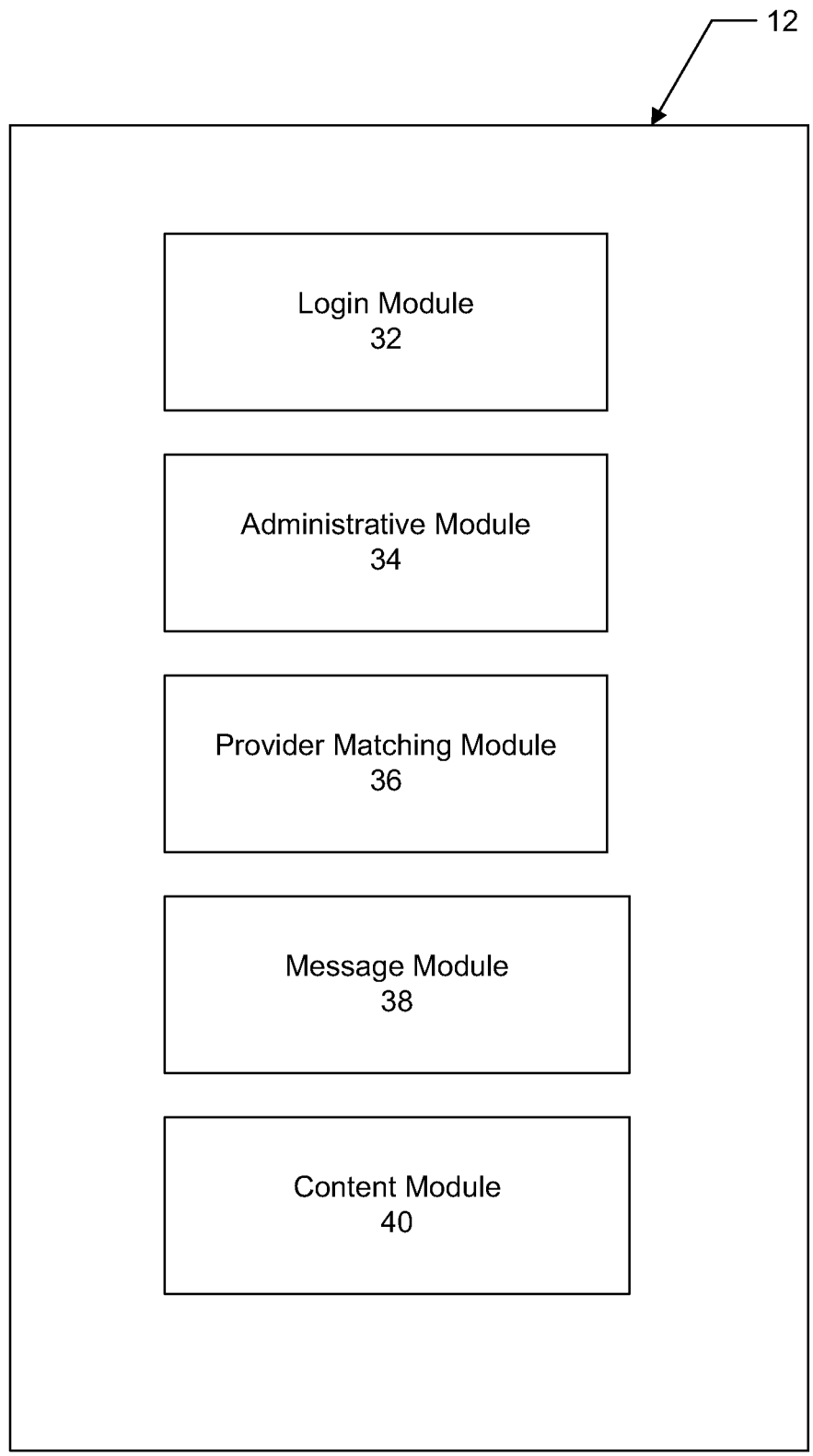
FIG. 2 is a high level block diagram representation of the modules or functionality which can be implemented by the system 12 of FIG. 1.

FIG. 2 shows a block diagram representation of the modules or functionality which can be implemented by the system 12. These modules may hereinafter collectively be referred to as "service matching functionality". In one embodiment, the modules or functionality implemented by system 12 includes a login module 32, an administrative module 34, a provider matching module 36, a messaging module 38, and a content module 40. Unless otherwise apparent from the context, the operations and actions described in connection with FIGS. 3-17 are implemented by modules 32, 34, 36, 38, and 40 of system 12.

When an insurance provider or agent accesses the insurance site 16, he is presented with a default home page. The insurance provider or agent is invited to open an account or register, thereby becoming a trusted insurance provider. In general, the operations and actions described in connection with FIGS. 3-7 and 10-14 are implemented by login module 32 and administrative module 34.

According to one aspect, login module 32 provides the features and tools that allow a user to register for an account and access the account. As used herein, registration refers to the creation of the account. In one embodiment, using login module 32, an account administrator controls, restricts, or approves the user for an account. For example, in some embodiments, the administrator may deny access to a user that has already had an account and was delinquent with the account.

According to one aspect, administrative module 34 provides the features and tools that allow an administrator to manage various types of users and their access permissions. For example, using administrative module 34, the account administrator may limit the viewing access of the user. For example, there may be a plurality of types of users: authenticated (e.g., has created an account), guest (e.g., has not created an account), and administrator. In general, the authenticated users participate in the insurance agent-to-business user matching process and messaging services. In general, guests can see the home page of the website which may be mainly advertising. In some embodiments, guests cannot log in as a "guest" that is not authenticated/registered. The administrator can manage the content of the Web sites and also manages the various users (e.g., can create, edit, and delete user accounts).

Figure 3:
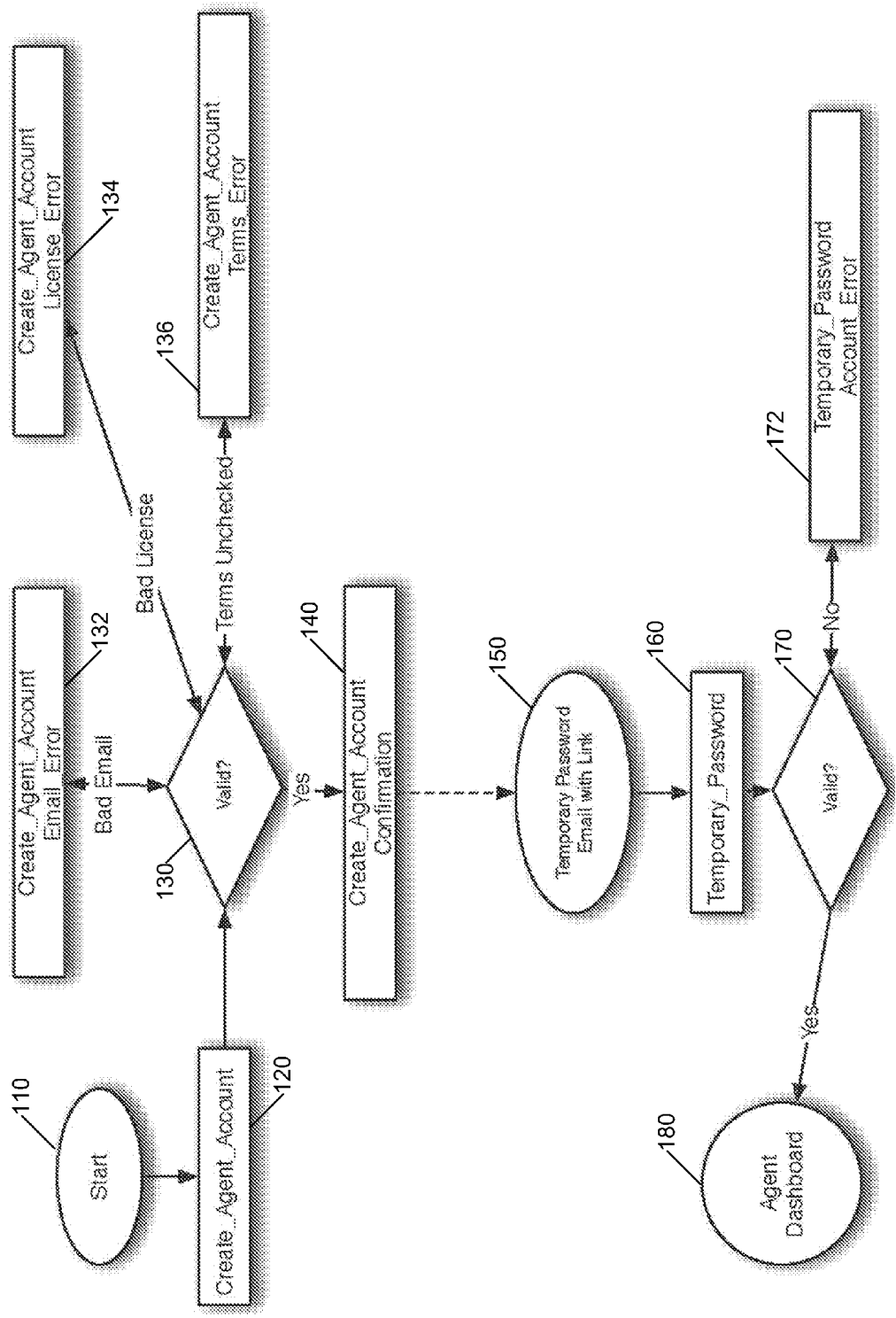
FIG. 3 is a flowchart illustrating the process by which an insurance provider or agent becomes a trusted provider in accordance with one embodiment.

Referring now to FIG. 3, an example process by which an insurance provider or agent becomes a trusted provider in accordance with one embodiment is shown. In a first step 110, the insurance agent chooses to initiate the process. The agent must then create an agent account, as shown in step 120. The agent can create an agent account by providing information such as shown in the fields in FIG. 4.

FIG. 4 represents an exemplary screen shot 200 of a new account registration for an agent. Screen shot 200 includes the following fields for entering the agent's information: First name 210, Last name 220, Company 230, Email 240, and Insurance License #250. Screen shot 200 also includes an Agreement box 260 for agreeing to the terms of service, provided in subpane 270. Screenshot 200 also includes an Entry button 280 that the agent selects in order to create the agent account.

Referring back to FIG. 3, a validation step is performed in step 130 after the agent has entered the information requested in FIG. 4. For example, if a bad email address was entered by the agent, an error message is created in step 132 and provided to the agent. FIG. 5 shows such an exemplary error message 310, which recites "The entered Email is not valid. Please try again."

If, in other embodiments, a bad insurance license number was entered by the agent, an error message is created in step 134 and provided to the agent. The error message may be similar to the one shown in FIG. 5, but recite language to the effect: "The Insurance License # is not valid. Please try again."

If, in still other embodiments, the agent fails to check Agreement box 260, thereby agreeing to the terms of service, an error message is created in step 136 and provided to the agent. The error message may be similar to the one shown in FIG. 5, but recite language to the effect: "You must agree to the terms of service to create an account. Please try again."

If the system determines in validation step 130 that the agent information provided is correct, a create agent account confirmation is provided to the agent in step 140. A temporary password email with a link is provided to the agent in step 150.

For example, FIG. 6 represents an exemplary screen shot 400 of a new agent account confirmation. For purely exemplary purposes, the screen shot 400 may recite the following: "Thank you for creating a new Agent account. An Email has been sent with your temporary password and instructions to view your account. Note: This email will provide a temporary password plus a link the to Temporary Password page." It should be appreciated that the text of screen shot 400 may vary, with the intent to inform the agent that an account has been created.

FIG. 7 represents an exemplary screen shot 500 of the email confirmation, referred to in FIG. 6. For purely exemplary purposes, the screen shot 500 may recite the following: "Dear [FirstName, LastName], Thank you for creating an Agent account. Here is a temporary password. Password: [Password] Please visit [URL Link to Temporary_Password] to log into your account. Thanks, Oferta Customer Service". It should be appreciated that the text of screen shot 500 may vary, with the intent to inform the agent that an account has been created and that the agent may use a temporary password to access the account.

Referring back to FIG. 3, once an agent tries to access his account using his temporary password in step 160, a validation step is performed in step 170. If the temporary password entered by the agent is not correct, an error message is created in step 172 and provided to the agent. The error message may be similar to the one shown in FIG. 5, but recite language to the effect: "The password is not valid. Please try again."

If the validation step in step 170 determines that the temporary password provided is correct, the agent will be directed to the agent dashboard in step 180. An exemplary agent dashboard is provided in FIG. 8.

Figure 8:
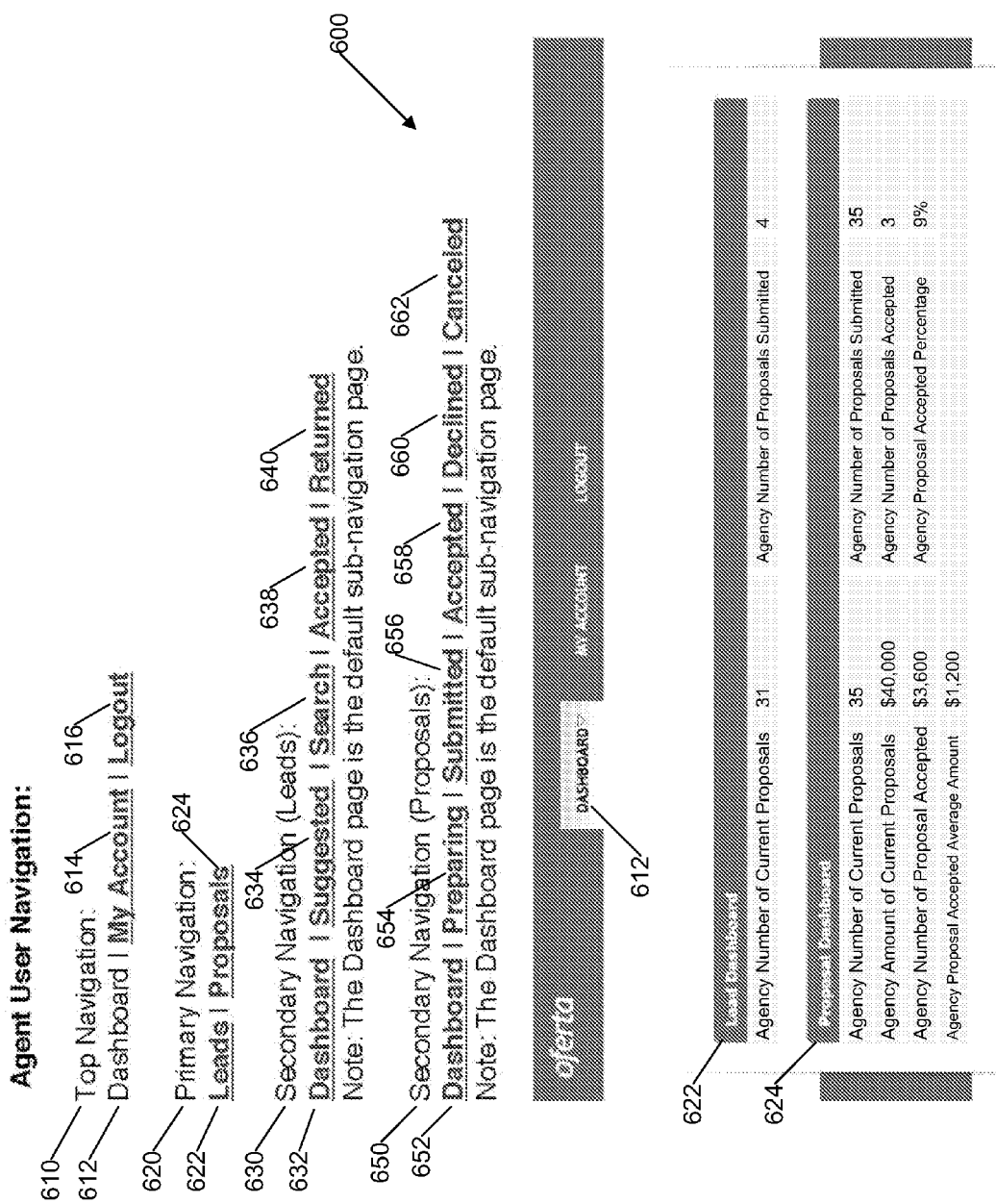

Referring to FIG. 8, a screen shot 600 is shown that provides the agent with user navigation information, as well as substantive information. For example, listed as part of the Top Navigation 610 is Dashboard 612, My Account 614, and Logout 616. Primary Navigation 620 includes Leads 622 and Proposals 624. Dashboard 612 is shown in further detail, including Leads 622 and Proposals 624 on the lower half of screen shot 600.

As used herein, a Lead is a request-for-insurance or a request-for-information (RFI) record that has been submitted by a business user and has not yet been accepted by the agent. In some embodiments, agents cannot see the details of the Lead until after it has been accepted. In general, a Lead will be the result of using a Lead Filter, which may use certain criteria, such as business type, state, minimum number of employees, etc., that the agent may use in determining the type of business users he wishes to do business with.

Back in agent user navigation, Secondary Navigation (Leads) 630 includes Dashboard 632, Suggested 634, Search 636, Accepted 638 and Returned 640. Secondary Navigation (Proposals) 650 includes Dashboard 652, Preparing 654, Submitted 656, Accepted 658, Declined 660 and Canceled 662.

Figure 9:
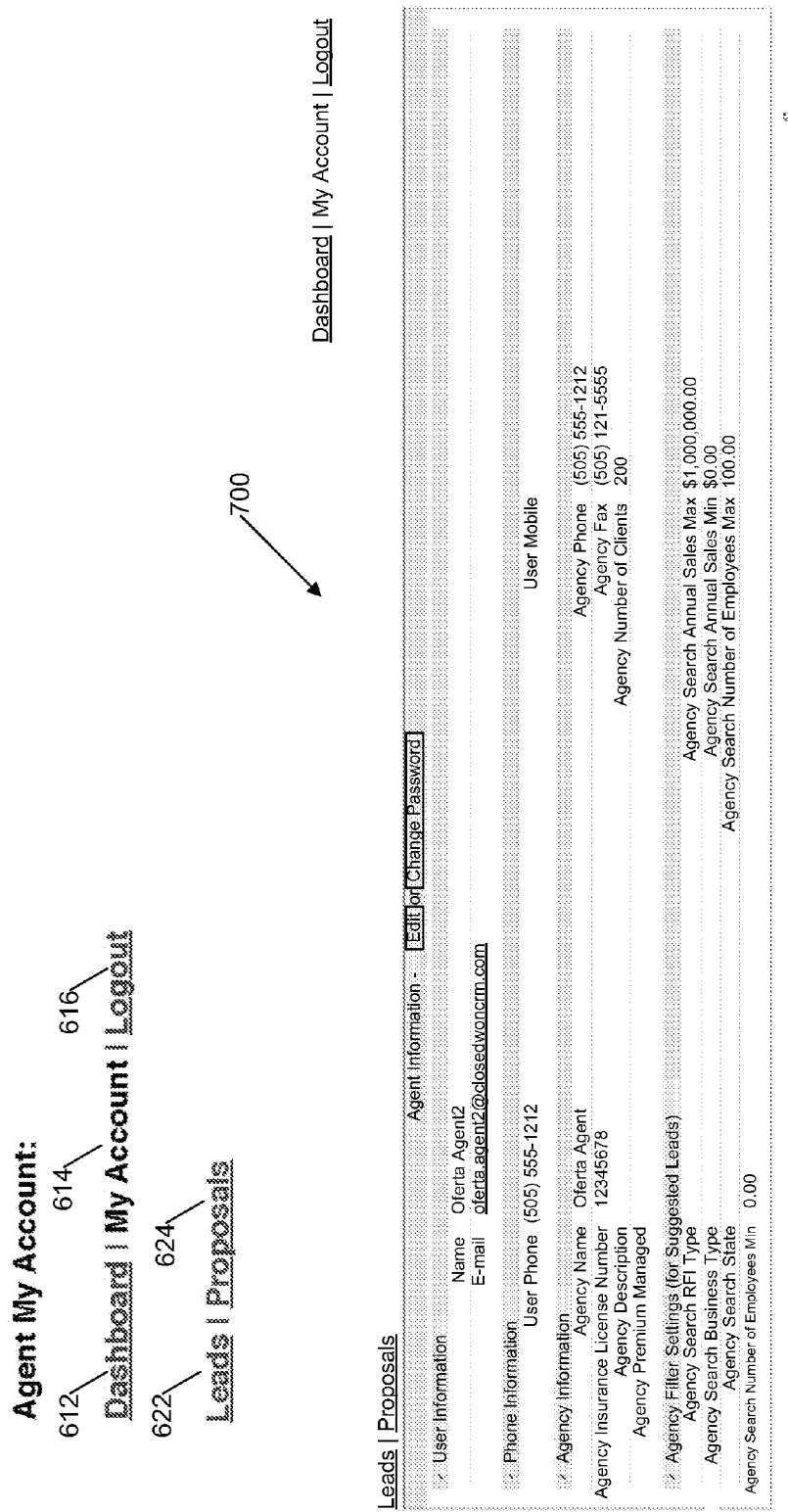

Referring to FIG. 9, a screen shot 700 is provided that shows what an agent's personal account (e.g., My Account 614) can look like. As shown, the agent's personal information is provided in the fields, and the agent has the ability to click on other screens, including Dashboard 612, Logout 616, Lead 622 and Proposals 624.

As discussed above, system 12 supports an insurance website for matching insurance providers or agents with business users. Therefore, in addition to agents creating an account, a business user wishing to request a quote from one or more agents, must also create an account.

Figure 10:
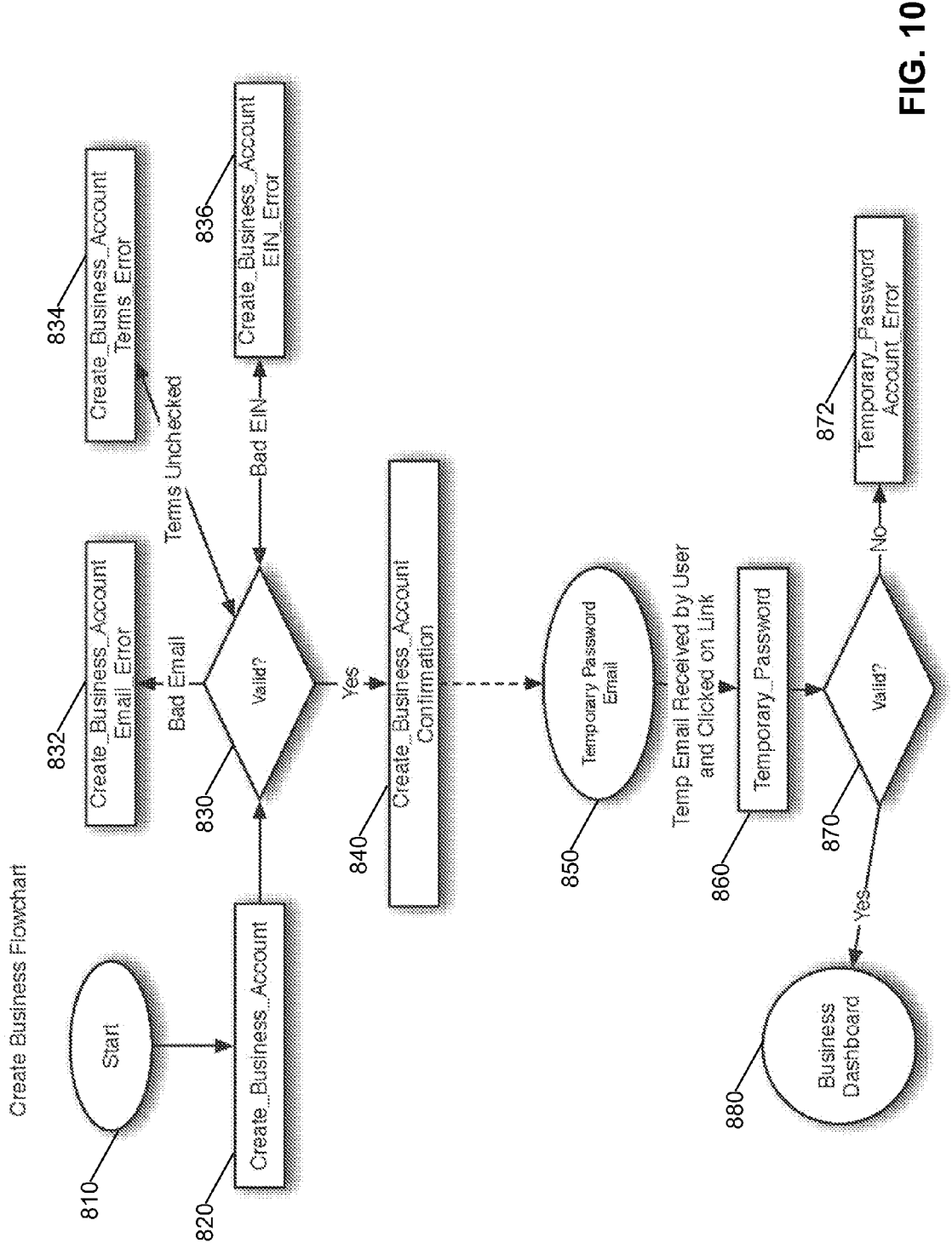
FIG. 10 is a flowchart illustrating the process by which a business user becomes a trusted user in accordance with one embodiment.

Referring now to FIG. 10, an example process by which a business becomes a trusted user in accordance with one embodiment is shown. In a first step 810, the business user chooses to initiate the process. The user must then create a business account, as shown in step 820. The user can create a business user account by providing information such as shown in the fields in FIG. 11.

Figure 11:
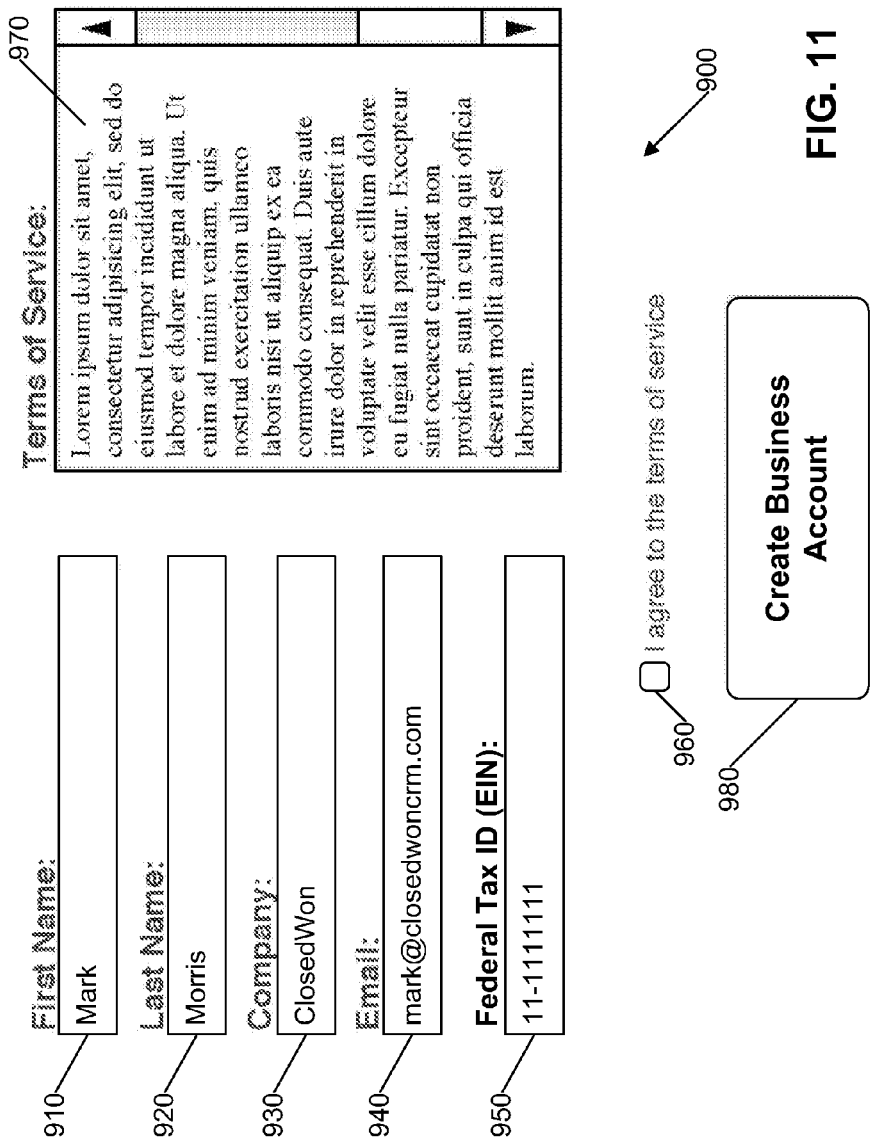

FIG. 11 represents an exemplary screen shot 900 of a new account registration for a business user. Screen shot 900 includes the following fields for entering the business user's information: First name 910, Last name 920, Company 930, Email 940, and Federal Tax ID (EIN) 950. Screen shot 900 also includes an Agreement box 960 for agreeing to the terms of service, provided in subpane 970. Screenshot 900 also includes an Entry button 980 that the user selects in order to create the business user account.

Referring back to FIG. 10, a validation step is performed in step 830 after the user has entered the information requested in FIG. 11. For example, if a bad email address was entered by the user, an error message is created in step 832 and provided to the user. FIG. 12 shows such an exemplary error message 1010, which recites "The entered Email is not valid. Please try again."

If, in other embodiments, the user fails to check Agreement box 960, thereby agreeing to the terms of service, and error message is created in step 834 and provided to the user. The error message may be similar to the one shown in FIG. 12, but recite language to the effect: "You must agree to the terms of service to create an account. Please try again."

If, in still other embodiments, a bad Federal Tax ID (EIN) number was entered by the user, an error message is created in step 836 and provided to the user. The error message may be similar to the one shown in FIG. 12, but recite language to the effect: "The entered Federal Tax ID (EIN) number is not valid. Please try again." Additionally, the user may be provided with a reminder to the effect: "Notes: The federal tax ID must be in a ##-####### (or 2 digits plus 7 digits separated by a dash)".

If the validation step in step 830 determines that the business user information provided is correct, a create business account confirmation is provided to the user in step 840. A temporary password email with a link is provided to the user in step 850.

Figure 13:
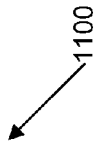

For example, FIG. 13 represents an exemplary screen shot 1100 of a new business account confirmation. For purely exemplary purposes, the screen shot 1100 may recite the following: "Thank you for creating a new Business account. An Email has been sent with your password and instructions to view your account. Note: This email will provide a temporary password plus a link the to Temporary Password page." It should be appreciated that the text of screen shot 1100 may vary, with the intent to inform the user that an account has been created.

Figure 14:

FIG. 14 represents an exemplary screen shot 1200 of the email confirmation, referred to in FIG. 13. For purely exemplary purposes, the screen shot 1200 may recite the following: "Dear [FirstName, LastName], Thank you for creating a Business account. Here is a temporary password. Password: [Password] Please visit [URL Link to Temporary Password] to log into your account. Thanks, Oferta Customer Service". It should be appreciated that the text of screen shot 1200 may vary, with the intent to inform the user that an account has been created and that the user may use a temporary password to access the account.

Referring back to FIG. 10, once a user tries to access his account using his temporary password in step 860, a validation step is performed in step 870. If the temporary password entered by the user is not correct, an error message is created in step 872 and provided to the user. The error message may be similar to the one shown in FIG. 12, but recite language to the effect: "The password is not valid. Please try again."

If the validation step in step 870 determines that the temporary password provided is correct, the user will be directed to the business dashboard in step 880. An exemplary business dashboard is provided in FIG. 15.

Referring to FIG. 15, a screen shot 1300 is shown that provides the business with user navigation information, as well as substantive information. For example, listed as part of the Top Navigation 1310 is Dashboard 1312, My Account 1314, and Logout 1316. Primary Navigation 1320 includes RFI 1322. Dashboard 1312 is shown in further detail on the lower half of screen shot 600.

As used herein, a request-for-insurance or request-for-information (RFI) is a record that has been submitted by a business user with the goal of receiving an insurance quote from one or more agents. The RFI is merely a request, that has not been approved by an agent.

Back in business user navigation, Secondary Navigation (RFIs) 630 includes Dashboard 1332, Preparing 1334, Submitted 1336, Accepted 1338, Expired 1340 and Canceled 1342.

Referring to FIG. 16, a screen shot 1400 is provided that shows what a business's personal account (e.g., My Account 1314) can look like. As shown, the business' personal information is provided in the fields, and the business has the ability to click on other screens, including Dashboard 1312, Logout 1316, and RFI 1322.

Referring back to FIG. 2, once a business user logs into his account (e.g., by following the process shown in FIG. 8), the user will have access to request an insurance quotation by submitting an RFI. In general, the operations and actions described in connection with submitting an insurance quotation and being matched up with one or more insurance agents are implemented by provider matching module 36.

In some embodiments, the business user is given the option of selecting the number of agents the business user wants to bid on the submitted RFI. For example, in some embodiments, a minimum limit is pre-set or predesignated by matching module 36. In other embodiments, the business user is able to designate a minimum or maximum number of bidders able to respond to the RFI.

Figure 17:
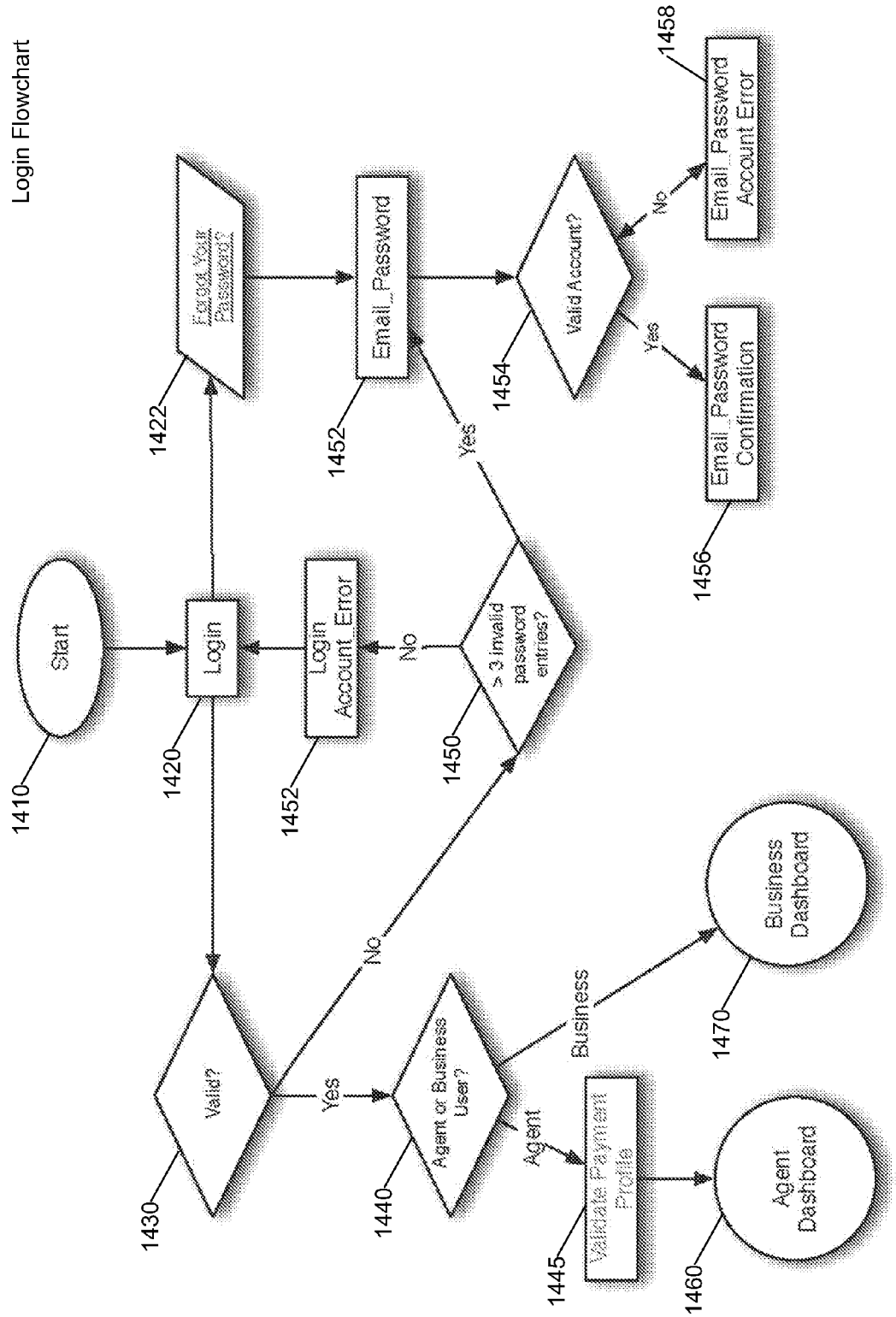
FIG. 17 is a flowchart illustrating the process by which an insurance provider or business user logs into an insurance matching website in accordance with one embodiment.

A general login flowchart is shown in FIG. 17 for matching a business with an agent according to one embodiment. For example, the process can begin when a business user or insurance agent initiates the process in a first step 1410. In the next step 1420, the user or agent attempts to login. The login is validated at step 1430 or the user or agent can request help (e.g., if they forget their password) in step 1422. If the login is invalid, the user can be allowed up to 3 invalid password entries in step 1450. If there are fewer than 3 invalid password entries, a login account error is provided to the user or agent in step 1452 and the user or agent begins the login process again in step 1420. If, however, there are more than, e.g., 3 invalid password entries, the password is emailed to the user or agent in step 1452. If it is determined that the user or agent has a valid account in step 1454, then the password confirmation is sent to the user or agent in step 1456. If it is determined that the user or agent has an invalid account in step 1454, then the user or agent is sent an email password account error in step 1458.

If the login is valid at as determined in step 1430, then it is determined if the user is an agent or business user in step 1440. If the user is an agent, the agent is sent to an agent dashboard in step 1460. Optionally, in some embodiments, the agent's payment profile can be validated in step 1445. For example, in one embodiment, validating an agent's payment profile means requiring the agent to register a credit card on file that validates their contact information is who they say they are. If the user is a business user, the user is sent to a business dashboard in step 1470.

Figure 22:
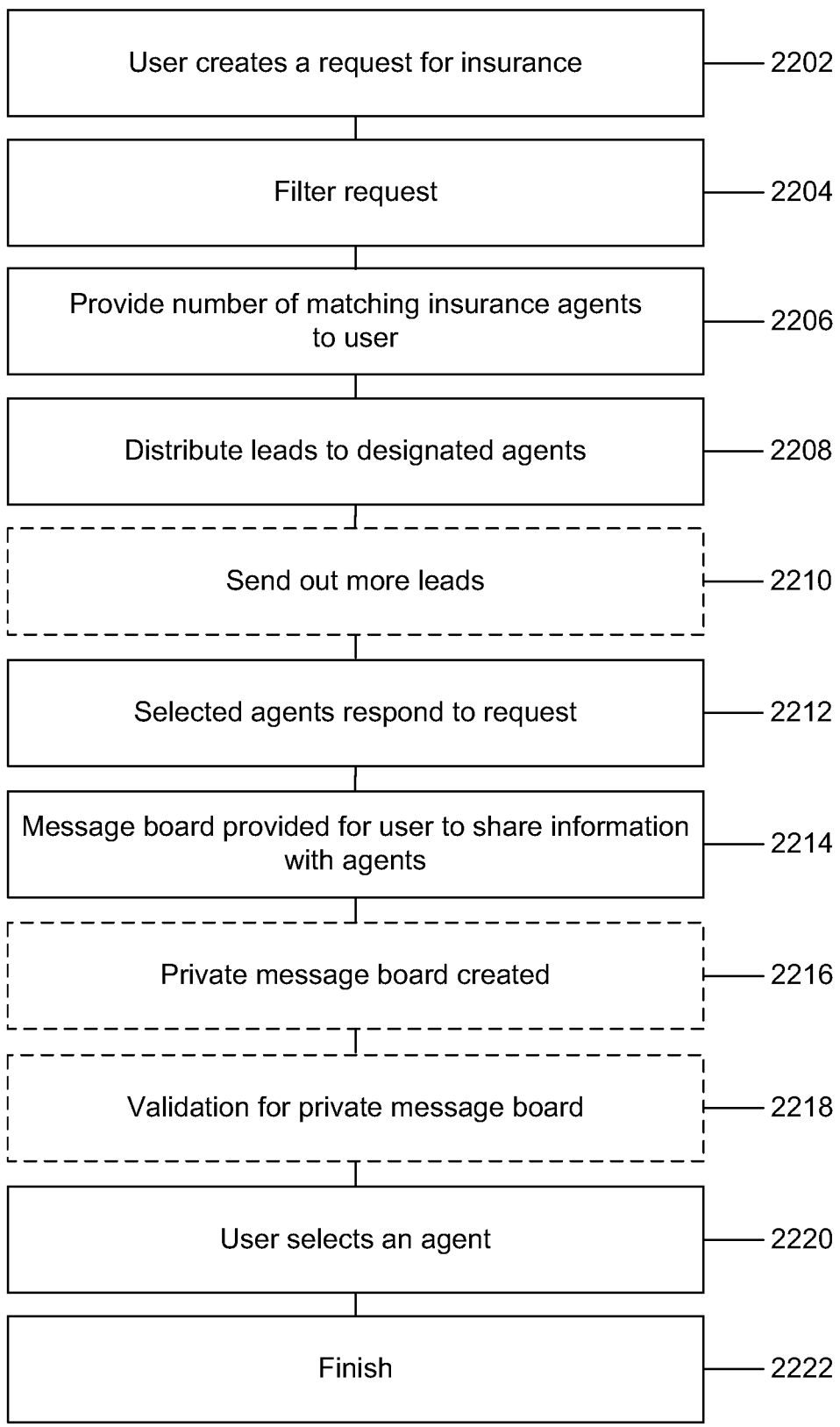
FIG. 22 is an exemplary flowchart illustrating the process by which a business user obtains a quote from an insurance agent in accordance with one embodiment.

According to one aspect, provider matching module 36 provides the features and tools that allow a user to create a request for an insurance quote in step 2202 as illustrated in the flowchart of FIG. 22. In some embodiments, provider matching module 36 provides a user a simple template to fill out in order to start a request for insurance. For example, as described above, a business user may desire to purchase any number of insurance benefits including theft, fire, group benefits, etc.

In response to the request of step 2202, module 36 can then filter the request in step 2204 based on various filtering agents (e.g., Lead Filter), and a number of matching insurance agents can be provided to the business user in step 2206.

The filtering agents can filter the request based on numerous criteria including geography; type of insurance being requested; amount of insurance needed; other preferences indicated by the business including that the provider be minority-owned, qualify as a small business, be based in a certain city or geography, etc.; as well as such factors as when was the last time an agent received a lead, how many active requests the agent is handling, the status of the agent with the system, etc.

As discussed above, the business user may be able to designate a minimum or maximum number of bidders able to respond to the RFI. In such embodiments, the matching module 36 distributes the leads (e.g., RFIs) to the designated number of agents in step 2208, e.g., with a message informing the agents that they have a certain time period (e.g., 1 hour) to accept the bid invitation. If the agents decline to accept the bid invitation or fail to respond, the matching module 36, can in some embodiments, send out more invites in step 2210 to other agents until the number of participants selected by the business user has been met. This preselection of the number of agents that are able to respond to the RFI has the benefit of preventing the business users from being "harassed" by an overwhelming number of agents; essentially by limiting the number of agents able to respond to an RFI, the business user is able to control the bidding process. Additionally, this preselection of the number of agents keeps the competitive landscape marginally or somewhat restricted so that agents are not continuously failing in the bidding process.

In step 2212, the selected agents can respond to the request. Often, an agent will need more information in order to provide an actual quote. Accordingly, a message board or collaboration area can be provided through which the business can share information with the selected agents in step 2214. At a certain point, the business may need to share information with individual agents separately.

Accordingly, in step 2216, private message boards or collaboration areas can be created on site 16 that link a business with a single agent. Accordingly, in addition to the "public" message board where all selected agents can post and access information, there can also be a plurality of "private" message boards where only one agent can access and post information in relation to a specific RFI.

Accordingly, in step 2218, some sort of credentialing or validation can occur in order to establish access to a private message board. Once the business has all the information necessary to make a decision, the business can select an agent in step 2220. The business and selected agent can then create, or continue to use a private message board to finalize the process in step 2222. In other words, the selected agent can get any additional information needed to finalize the offering.

Figure 21:
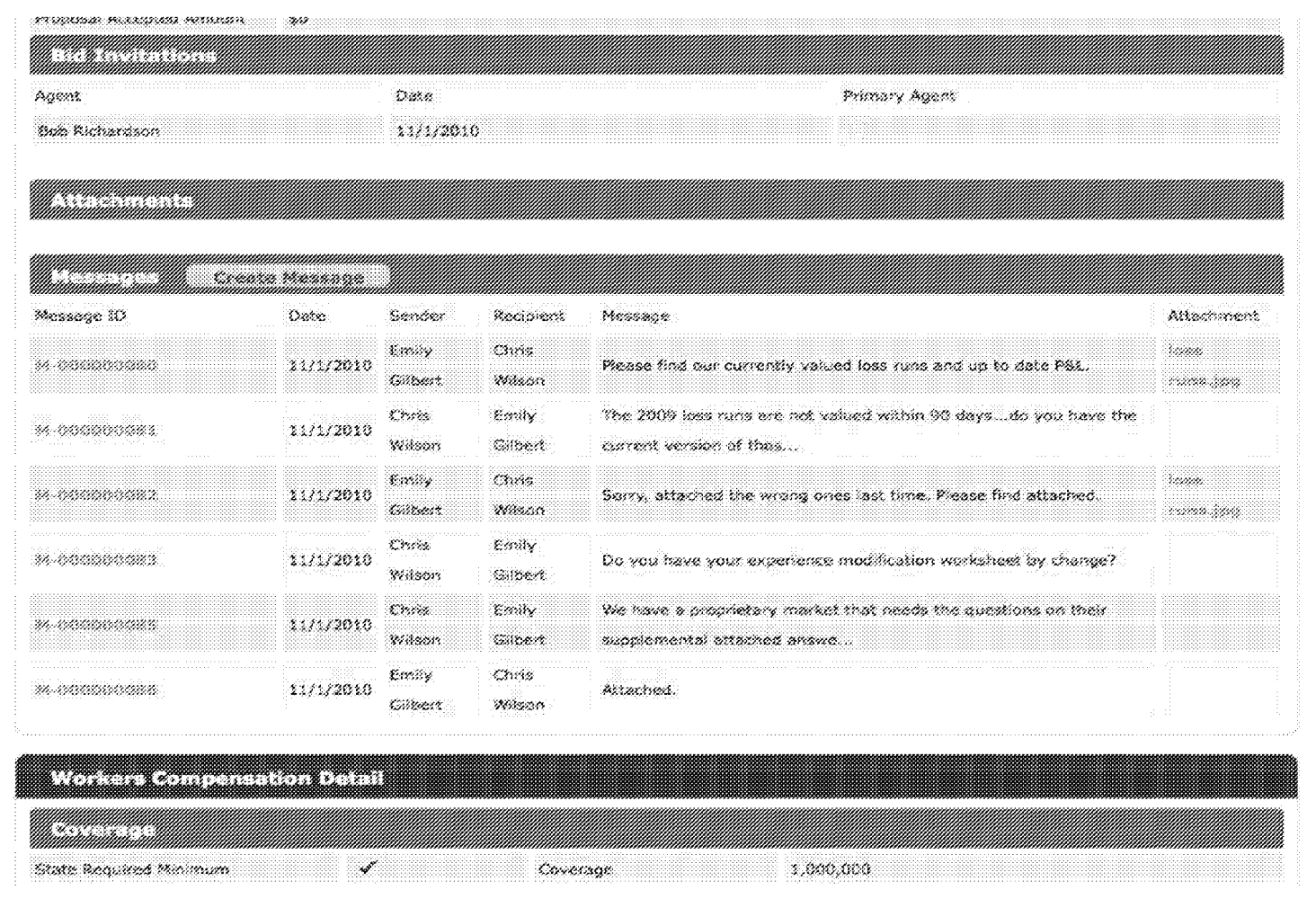

Referring back to FIG. 2, messaging module 38 provides the features and tools that allow a business user to post questions or messages to an online bulletin-type, messaging board or collaboration area. For example, in one embodiment, the messaging board could appear similar to the dashboards shown in FIGS. 8 and 15. In some embodiments, messaging module 38 provides a user a simple template to fill out in order to ask or post a question to the messaging board. For example, FIGS. 19-21 show exemplary screen shots of a messaging board in accordance with some embodiments. As is apparent from FIGS. 19-21, the messaging board portion can be located on the lower region of the user's dashboard.

In some embodiments, the messaging module 38 allows a user to post questions, such as text messages to a messaging screen or a collaborative workspace. The user, in some embodiments, can download or upload information into the post. As noted, the post can be visible for all insurance agents to see or may be private or semi-private, such that only certain insurance agents can see the post or that the insurance agents appear anonymous. Also, in other embodiments, messaging module 38 may support one-to-one messaging (e.g., text or email) or one-to-many messaging.

Still referring to FIG. 2, content module 40 preferably manages the information for items posted on the messaging screen and for items (e.g., RFIs) submitted in the insurance matching/bidding process. As explained above, in one embodiment, the user enters the information necessary to request an insurance bid, for example, and the content module 40 stores and makes available the insurance bid to the Web site. In some embodiments, the content module 40 is responsible for determining when an insurance bid becomes available to insurance agents (e.g., when certain matching criteria have been met).

In some embodiments, content module 40 also manages the information submitted in becoming a registered business user or insurance agent, and in the purchasing of insurance. For example, content module 40 can perform the validation steps in determining if an insurance provider's Insurance License # is legitimate (e.g., by checking against a database) and if the business user's Federal Tax ID # (EIN) is legitimate (e.g., by checking against a database). In another example, content module 40 may manage the purchasing of insurance between the business user and an insurance agent by validating the insurance agent's payment profile.

Figure 18:
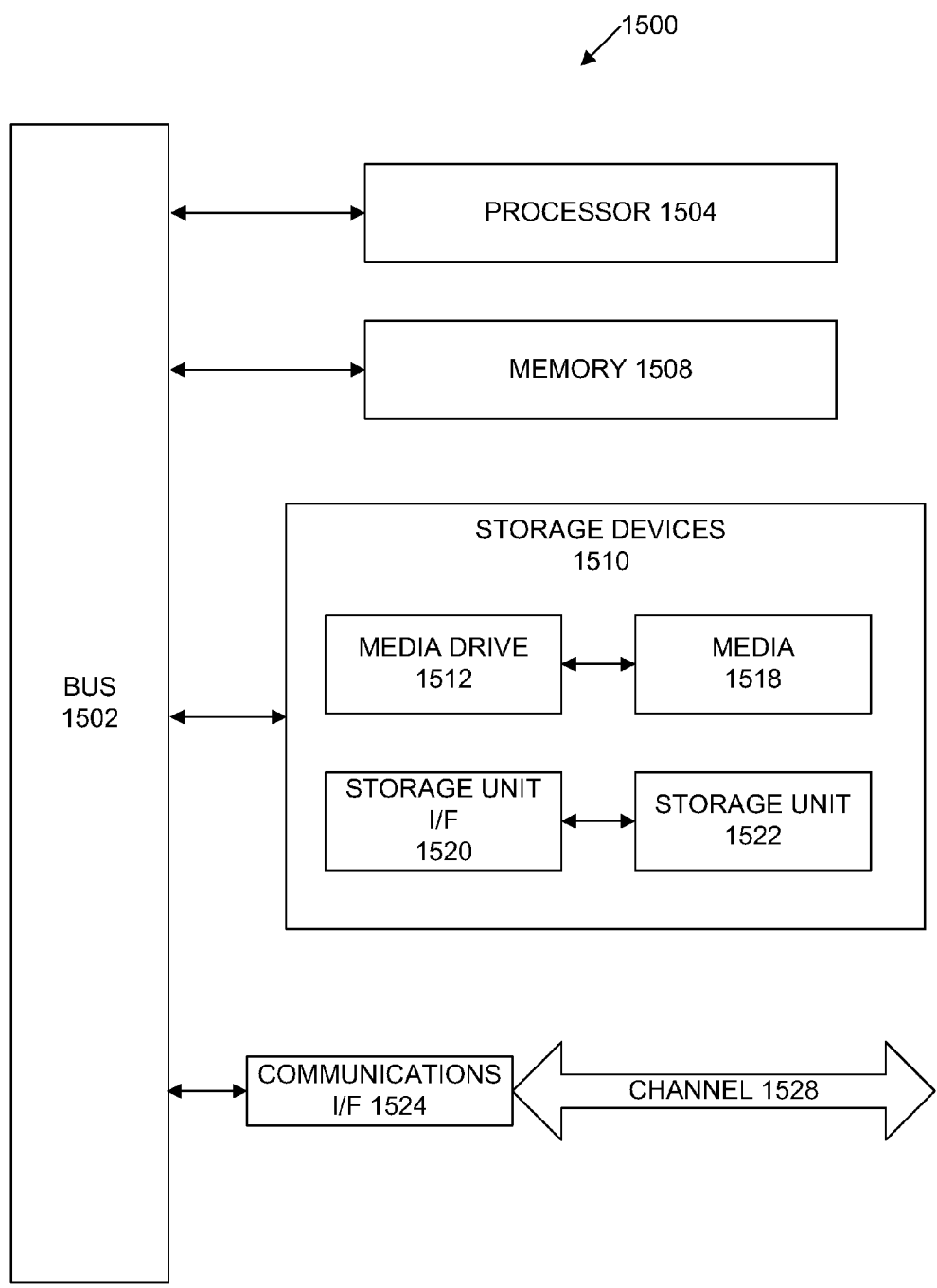
FIG. 18 is a typical computing system that may be employed to implement processing functionality in accordance with one embodiment.

FIG. 18 illustrates a typical computing system 1500 that can be employed to implement processing functionality required, e.g., by the embodiment described herein. For example, computing system 1500 of this type may be used in clients and servers. Those skilled in the relevant art will also recognize how to implement the embodiments using other computer systems or architectures. Computing system 1500 may represent, for example, a desktop, laptop or notebook computer, hand-held computing device (PDA, cell phone, palmtop, and the like), mainframe, server, client, or any other type of special or general purpose computing device as may be desirable or appropriate for a given application or environment. Computing system 1500 can include one or more processors, such as a processor 1504. Processor 1504 can be implemented using a general or special purpose processing engine such as, for example, a microprocessor, microcontroller or other control logic. In this example, processor 1504 is connected to a bus 1502 or other communication medium.

Computing system 1500 can also include a main memory 1508, such as random access memory (RAM) or other dynamic memory, for storing information and instructions to be executed by processor 1504. Main memory 1508 also may be used for storing temporary variables or other intermediate information during execution of instructions to be executed by processor 1504. Computing system 1500 may likewise include a read only memory ("ROM") or other static storage device coupled to bus 1502 for storing static information and instructions for processor 1504.

The computing system 1500 may also include information storage system 1510, which may include, for example, a media drive 1512 and a removable storage interface 1520. The media drive 1512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1518 may include, for example, a hard disk, floppy disk, magnetic tape, optical disk, CD or DVD, or other fixed or removable medium that is read by and written to by media drive 1512. As these examples illustrate, the storage media 1518 may include a computer-readable storage medium having stored therein particular computer software or data.

In alternative embodiments, information storage devices 1510 may include other similar components for allowing computer programs or other instructions or data to be loaded into computing system 1500. Such components may include, for example, a removable storage unit 1522 and a storage unit interface 1520, such as a program cartridge and cartridge interface, a removable memory (for example, a flash memory or other removable memory module) and memory slot, and other removable storage units 1522 and interfaces 1520 that allow software and data to be transferred from the removable storage unit 1518 to computing system 1500.

Computing system 1500 can also include a communications interface 1524. Communications interface 1524 can be used to allow software and data to be transferred between computing system 1500 and external devices. Examples of communications interface 1524 can include a modem, a network interface (such as an Ethernet or other NIC card), a communications port (such as for example, a USB port), a PCMCIA slot and card, and the like. Software and data transferred via communications interface 1524 are provided via a channel 1528. Some examples of a channel include a phone line, a cellular phone link, an RF link, a network interface, a local or wide area network, and other communications channels 1528 to perform features or functions of embodiments of the invention. Note that the code may directly cause the processor to perform specified operations, be compiled to do so, and/or be combined with other software, hardware, and/or firmware elements (e.g., libraries for performing standard functions) to do so.

While various embodiments have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skilled in the art, two or more modules may be combined to form a single module that performs the associated functions according to embodiments of the invention.

In this document, the terms "computer program product," "computer-readable medium," and the like may be used generally to refer to media such as, for example, memory 1508, storage devices 1510, or storage unit 1522. These and other forms of computer-readable media may be involved in storing one or more instructions for use by processor 1504 to cause the processor 1504 to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the embodiments described herein. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to," or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the embodiments described herein. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element.

What is claimed:

1. A system for matching a business to two or more insurance agents, the system comprising:
    at least one hardware processor; and
    at least one executable software module that, when executed by the at least one hardware processor,
        receives registration requests from a plurality of insurance agents which are not insurance carriers,
        for each of the plurality of insurance agents,
            requests an agent license information,
            receives an agent license information from the insurance agent,
            validates the agent license information,
            requests product information from the insurance agent, and
            receives the product information;
        receives a registration request from a business,
        requests tax identification information from the business,
        receives the tax identification information,
        validates the tax identification information,
        receives a product request from the business, the product request defining certain product information,
        matches the business to a subset of two or more validated ones of the plurality of insurance agents based on the certain product information and the product information each insurance agent provided,
        provides the product request to the subset of validated insurance agents, and
        creates a plurality of private collaboration areas, wherein each of the plurality of private collaboration areas links the business with a single one of the subset of validated insurance agents and is configured to facilitate one or more exchanges of information between the business and the insurance agent.

2. The system of claim 1, wherein the at least one executable software module further:
    receives one or more proposals from one or more of the subset of validated insurance agents; and
    provides the one or more proposals to the business.

3. The system of claim 2, wherein the at least one executable software module further:
    maintains status information with respect to the status of the product request and the one or more proposals; and
    provides the status information to one or both of the business and the subset of validated insurance agents.

4. The system of claim 2, wherein the at least one executable software module further:
    receives an acceptance of one of the one or more proposals from the business; and
    notifies the insurance agent from which the accepted proposal was received that the accepted proposal was accepted.

5. The system of claim 1, wherein the at least one executable software module further requests agent name information in response to the registration request from each of the plurality of insurance agents.

6. The system of claim 1, wherein the at least one executable software module further, for each of the plurality of insurance agents:
    requests agent contact information from the insurance agent;
    receives the agent contact information from the insurance agent; and
    verifies the agent contact information.

7. The system of claim 1, wherein the at least one executable software module further creates an agent account for each of the plurality of insurance agents with valid agent license information.

8. The system of claim 1, wherein the agent license information comprises a license number issued by a licensing authority or agency.

9. The system of claim 1, wherein the at least one executable software module further requests business name information in response to the registration request from the business.

10. The system of claim 1, wherein the at least one executable software module further:
    requests business contact information in response to the registration request from the business; and
    verifies the business contact information.

11. The system of claim 1, wherein the at least one executable software module further creates a business account for the business.

12. The system of claim 1, wherein the tax identification information comprises a federal tax identification number.

13. The system of claim 1, wherein the at least one executable software module further allows the business to collaborate in a public message board with a plurality of insurance agents in order to exchange information in relation to proposals.

14. The system of claim 13, wherein the at least one executable software module further receives one or more uploads of documents to the public message board.

15. A method for facilitating a purchase of insurance, the method comprising:
    Receiving, by a computer, registration requests from a plurality of insurance agents which are not insurance carriers;
    for each of the plurality of insurance agents,
        requesting, by a computer, an agent license information,
        receiving, by a computer, an agent license information from the insurance agent,
        validating, by a computer, the agent license information,
        requesting, by a computer, product information from the insurance agent, and
        receiving, by a computer, the product information;
    receiving, by a computer, a registration request from a business;
    requesting, by a computer, tax identification information from the business;
    receiving, by a computer, the tax identification information;
    validating, by a computer, the tax identification information;

receiving, by a computer, a product request from the business, the product request defining certain product information;

matching, by a computer, the business to a subset of two or more validated ones of the plurality of insurance agents based on the certain product information and the product information each insurance agent provided;

providing, by a computer, the product request to the subset of validated insurance agents; and, creating, by a computer, a plurality of private collaboration areas, wherein each of the plurality of private collaboration areas links the business with a single one of the subset of validated insurance agents and is configured to facilitate one or more exchanges of information between the business and the insurance agent.

16. The method of claim 15, further comprising:

receiving, by a computer, one or more proposals from one or more of the subset of validated insurance agents; and providing, by a computer, the one or more proposals to the business.

17. The method of claim 16, further comprising:

maintaining, by a computer, status information with respect to the status of the product request and the one or more proposals; and providing, by a computer, the status information to one or both of the business and the subset of validated insurance agents.

18. The method of claim 16, further comprising:

receiving, by a computer, g an acceptance of one of the one or more proposals from the business; and notifying, by a computer, the insurance agent from which the accepted proposal was received that the accepted proposal was accepted.

19. The method of claim 16, wherein matching the business to a subset of two or more validated ones of the plurality of insurance agents comprises:

determining, by a computer, a number of bidders allowed;

matching, by a computer, the business to a first subset of two or more validated ones of the plurality of insurance agents; and, if a number of the received one or more proposals is less than the number of bidders allowed, matching, by a computer, the business to one or more additional subsets of one or more validated ones of the plurality of agents until the number of received one or more proposals is equal to the number of bidders allowed.

20. The method of claim 19, wherein determining, by a computer, a number of bidders allowed comprises receiving the number of bidders allowed from the business.

21. The method of claim 15, further comprising requesting by a computer, agent name information in response to the registration request from each of the plurality of insurance agents.

22. The method of claim 15, further comprising, for each of the plurality of agents:

requesting, by a computer, agent contact information from the insurance agent;

receiving, by a computer, the agent contact information from the insurance agent; and verifying, by a computer, the agent contact information.

23. The method of claim 15, further comprising creating, by a computer, an agent account for each of the plurality of insurance agents with valid agent license information.

24. The method of claim 15, wherein the agent license information comprises a license number issued by a licensing authority or agency.

25. The method of claim 15, further comprising requesting, by a computer, business name information in response to the registration request from the business.

26. The method of claim 15, further comprising:

requesting, by a computer, business contact information in response to the registration request from the business; and verifying, by a computer, the business contact information.

27. The method of claim 15, further comprising creating, by a computer, a business account for the business.

28. The method of claim 15, wherein the tax identification information comprises a federal tax identification number.

29. The method of claim 15, further comprising allowing, by a computer, the business to collaborate in a public message board with a plurality of insurance agents in order to exchange information in relation to proposals.

30. The method of claim 29, further comprising receiving, by a computer, one or more uploads of documents to the public message board.

* * * * *